(12) United States Patent
Seymour

(10) Patent No.: US 12,282,729 B2
(45) Date of Patent: Apr. 22, 2025

(54) SYSTEM FOR DYNAMIC EDITING WITH HIDDEN CODES

(71) Applicant: Arthur Seymour, Deerfield, IL (US)

(72) Inventor: Arthur Seymour, Deerfield, IL (US)

(73) Assignee: Advins, Inc., Deerfield, IL (US)

( * ) Notice: Subject to any disclaimer, the term of this patent is extended or adjusted under 35 U.S.C. 154(b) by 509 days.

(21) Appl. No.: 17/836,370

(22) Filed: Jun. 9, 2022

(65) Prior Publication Data
US 2022/0300700 A1  Sep. 22, 2022

Related U.S. Application Data

(63) Continuation-in-part of application No. 17/174,333, filed on Feb. 11, 2021, now abandoned.

(60) Provisional application No. 62/983,627, filed on Feb. 29, 2020.

(51) Int. Cl.
*G06F 40/166* (2020.01)
*G06F 40/134* (2020.01)

(52) U.S. Cl.
CPC .......... *G06F 40/166* (2020.01); *G06F 40/134* (2020.01)

(58) Field of Classification Search
None
See application file for complete search history.

(56) References Cited

U.S. PATENT DOCUMENTS

| | | | | |
|---|---|---|---|---|
| 5,761,683 A * | 6/1998 | Logan | ................. | G06F 16/9577 715/208 |
| 9,549,035 B2 * | 1/2017 | Duncan | ................... | G06F 16/95 |
| 10,915,595 B1 * | 2/2021 | Van Oort | ............ | G06F 16/2228 |
| 2005/0120292 A1 * | 6/2005 | Suzuki | ................. | G06F 16/958 715/208 |
| 2006/0059416 A1 * | 3/2006 | Lin | ..................... | G06F 16/9566 707/E17.115 |
| 2007/0185860 A1 * | 8/2007 | Lissack | ............... | G06F 16/9535 707/999.005 |
| 2007/0272733 A1 * | 11/2007 | Spector | ............... | G06F 16/9554 235/494 |
| 2008/0065395 A1 * | 3/2008 | Ferguson | ............... | G06Q 30/02 705/1.1 |
| 2009/0018911 A1 * | 1/2009 | An Chang | ......... | G06Q 30/0212 705/14.14 |
| 2009/0307086 A1 * | 12/2009 | Adams | ................ | G06F 16/9562 707/E17.108 |
| 2010/0107053 A1 * | 4/2010 | Kanzaki | ................ | G06F 16/972 715/234 |
| 2010/0275117 A1 * | 10/2010 | Vion-Dury | .......... | G06F 16/9558 715/234 |
| 2010/0318922 A1 * | 12/2010 | Strathearn | ............. | G06F 16/345 715/751 |
| 2011/0087966 A1 * | 4/2011 | Leviathan | ........... | G06F 16/9577 715/745 |
| 2011/0226850 A1 * | 9/2011 | Ungos | ..................... | G06F 3/002 235/375 |

(Continued)

*Primary Examiner* — Howard Cortes
(74) *Attorney, Agent, or Firm* — Justin Lampel

(57) ABSTRACT

A method for changing printed material, hereafter called interactive book, is provided. The original interactive book may have imbedded links to an External Dedicated Book Addition. The present interactive book allows for multiple people to be able to constantly update External Dedicated Book Additions for the book and solve problems using hidden codes to receive a reward.

4 Claims, 7 Drawing Sheets

(56) References Cited

U.S. PATENT DOCUMENTS

| | | | | |
|---|---|---|---|---|
| 2011/0231768 A1* | 9/2011 | Tovar | G06F 16/954 | 715/735 |
| 2012/0173692 A1* | 7/2012 | Lakes | G06F 16/9566 | 709/223 |
| 2012/0234907 A1* | 9/2012 | Clark | G06F 16/9554 | 235/375 |
| 2012/0280031 A1* | 11/2012 | Nelson | G06F 3/002 | 235/375 |
| 2012/0284649 A1* | 11/2012 | Levy | G06Q 50/01 | 715/753 |
| 2012/0325901 A1* | 12/2012 | Ross | G06F 16/958 | 235/494 |
| 2013/0043302 A1* | 2/2013 | Powlen | G06Q 50/01 | 235/494 |
| 2013/0323697 A1* | 12/2013 | Shadduck | G09B 19/22 | 434/222 |
| 2013/0333022 A1* | 12/2013 | Torkkel | G06F 21/60 | 726/17 |
| 2014/0026028 A1* | 1/2014 | Hepper | G06F 16/958 | 715/234 |
| 2014/0117076 A1* | 5/2014 | Eberlein | G06F 16/9566 | 235/375 |
| 2014/0365288 A1* | 12/2014 | Liu | G06Q 30/0236 | 705/14.26 |
| 2015/0026594 A1* | 1/2015 | Dave | G06Q 50/01 | 715/753 |
| 2015/0248665 A1* | 9/2015 | Walz | G06Q 20/227 | 705/40 |
| 2016/0196484 A1* | 7/2016 | Ciavatta | G06K 19/06037 | 235/462.1 |
| 2019/0163834 A1* | 5/2019 | Johnson, Jr. | G06F 16/214 | |
| 2020/0026737 A1* | 1/2020 | Brown | G06F 3/011 | |

\* cited by examiner

SYSTEM FOR DYNAMIC EDITING WITH HIDDEN CODES

REFERENCE TO RELATED APPLICATIONS

This application is a Continuation in Part of U.S. Ser. No. 17/174,333 filed Feb. 11, 2021 which, in turn claims priority to U.S. Provisional Application No. 62/983,627 that was filed on Feb. 29, 2020, the entire contents of which are incorporated by reference herein.

BACKGROUND OF THE INVENTION

Books and other printed materials are typically composed of many pages (made of papyrus, parchment, vellum, or paper) bound together and generally protected by a durable cover. The technical term for this physical arrangement is codex (in the plural, codices). A single sheet in a codex is a leaf, and each side of a leaf is a page.

Most books are of a length that requires time to compose and cost to produce. Google® has estimated that as of 2010, approximately 130,000,000 distinct tides had been published. In some wealthier nations, the sale of printed books has decreased because of the increased usage of electronic or "e-books" which are available on computers, tablets, phones, etc.

Recently, due to the rise in availability of affordable handheld computing devices, the opportunity to share texts through electronic means known as the "e-book" grew in popularity. To read an e-book one must have a device such as the Sony Reader®, Barnes & Noble Nook®, Kobo eReader®, or the Amazon Kindle®. Since e-books exist on the Internet, they may be edited easily. Further, it is easy for the publisher to update information contained in the book so that new consumers purchasing or otherwise downloading the information receive the most current information and edits. Any past printings from this source, however, will remain unchanged.

There are many reasons people buy e-books including, usually lower prices, easy transportation of numerous titles, instant access to the book, increased comfort (one may buy from home or on the go with mobile devices) and a larger selection of titles. With e-books, electronic bookmarks make referencing easier, and e-book readers may allow the user to annotate pages. Both fiction and non-fiction hooks come in e-book formats.

The ownership of a paper book is fairly straight forward, but generally subject to legal restrictions on renting or copying for books that have not yet fallen into the public domain. The purchaser of an e-book's digital file generally also has some restrictions and/or limitations such as, for example, restrictions due to digital rights management: provisions, copyright issues, or limitations based on the publisher's business failing or even the user's credit card expiring.

A QR bar code (quick response code hereafter QR code) in or on a book, may contain data for a locator, identifier or tracker, for example, that points to a website or application for additional information pertaining to the book (e.g. the price of the book). A QR code is a type of two-dimensional bar code that is often used to provide access to information directly or through an Internet device with a camera. The locator, identifier or tracker that the QR code points to initially will be hereafter termed the Dedicated Book Addition. To visit different Dedicated Book Additions requires a different identifier. There are many devices that allow displaying different content through Internet links, as described above, for e-books. The printed book or e-book, however, does not allow the reader to change the link in the e-book without changing the e-book itself. Various types of editing in existence today are shown here below.

U.S. Pat. No. 9,524,036 to Cassidy discloses various types of content which may be displayed through an interface of a computing device. Portions of this content, such as words or alphanumeric characters, can have a visual identifier displayed proximate those portions. The identifiers can indicate the availability of additional content, such as one or more alternative spellings or corrections, links to additional information, alternative views, and links to contact information for a name in an address book. In one example, a default viewing orientation of the computing device can be determined for a user viewing the content on the interface. Upon detecting a rotation of the computing device, a banner or other graphical element is displayed for each of the displayed portions that are associated with a visual identifier on the interface. Accordingly, a user can select one of those elements to receive the additional information, Further, U.S. Pat. No. 9,465,504 to Jurgens discloses a system for automated collaborative behavior analysis using temporal motifs. The system receives an input documents and change log files of a collaborative media, where the documents are continuously edited by multiple authors and where edits are recorded in the change log files, such as Wikipedia. A type of editing behavior by the authors of a given document is identified, and the edits made to the document are analyzed. The system reports how the authors interacted in a collaboration process, resulting in a set of reported author interactions. From the set of reported author interactions, a set of author interactions that are most and least significant in the collaboration process are identified. Then, based on the set of identified author interactions, future effects on documents of the collaborative media are estimated.

Still further, U.S. Pat. No. 10,402,061 to Kohlmeier discloses an assisted content authoring productivity tool which can provide a set of content related to at least one topic determined from a user's expression of intent. The content can include topics that are not obviously related to the user's topic, but identified from indirect cluster connections found in a graph model of information such as, but not limited to, an online encyclopedia like Wikipedia. A document can be populated with topic anchors so a user can return to or have generated a set of content related to a particular topic. The topic anchor can include a graphical user interface including a topic exploration object that, when selected, initiates a command to request information related to that topic.

All of the above patents require a physical change to the original document order to change the link and/or add the name of the editor or reader that made that change.

In accordance with a first aspect of one embodiment of the present interactive e-book or printed book (both hereafter 'interactive book') may have an identifier printed within it which points to an External Dedicated Book Addition. This identifier may be, but is not limited to, a QR code, a link, a footnote, a physical mailing address, or a telephone number. The External Dedicated Book Addition may provide the reader with different methods for changing, or suggesting changes to, the original interactive e-book without changing the original printed book version of that same original interactive book.

In accordance with a second aspect of the embodiment, the present interactive book identifier, hereafter 'Imbedded Link', may direct the reader to the External Dedicated Book Addition when reader uses the imbedded link. The External Dedicated Book Addition may then direct the reader, or suggest to the reader, other information related to the same book topic. This other information source may be, but is not limited to, an Internet site, a video, a movie, a song, text, pictures, a hidden code verification, a test, or another book on the same or similar topic of the original book.

In accordance with a third aspect of the present interactive book, a controller of the External Dedicated Book Addition may be incorporated into the system. The reader may contact the controller of the External Dedicated Book Addition and may request a change or edit to the information within the External Dedicated Book Addition. The request may be, for example, to correct, change, or add to the content of the original External Dedicated Book Addition.

In accordance with a fourth aspect of the present interactive book, any change made to the External Dedicated Book Addition may be recorded and accessed through a separate link, hereafter called the Dynamic Editors imbedded link, located within the original work. This recorded data may show date of change, person that requested the change, the original information that was previously recorded in the External Dedicated Book Addition, and information about hidden codes that have been discovered by other readers.

In accordance with a fifth aspect of the present interactive book, all books printed previous to the requested change, being printed now, or to be printed in the future with the same imbedded links, will contain in their imbedded links the newly edited information.

In accordance with a sixth aspect of the present interactive book, all books printed previous to the change, being printed now, or to be printed in the future with the same imbedded links, will contain in a Dynamic Editors Link to the name of the person that made the edit or code discovery. This Dynamic Editors Link may also contain the date of the change and the data of other previous links that have been changed.

In accordance with a seventh aspect of the present interactive book, the External Dedicated Book Addition truly also provide options to the reader in which the reader may change the External Dedicated Book Addition and may further provide the reader with clues on how to solve for any hidden codes.

In accordance with an eighth aspect of the interactive book, the book controller may offer information on verification of the correct solution for a hidden code, riddle, or test when contacted. This information may also allow the person contacting the controller to win a prize or receive an unpublished explanation of information explaining in greater detail certain contents of the book.

In accordance with a ninth aspect of the present interactive book, the present interactive book may credit each edit done by a reader to that original reader and may allow other readers to rate and review the original readers edits.

In accordance with a tenth aspect of the present interactive book, the present interactive book may allow a later reader (the "second reader") to review all the edits or proposed edits of an earlier original reader. More specifically, a second reader may review the edits and proposed edits and the rating scores of the original reader and, if satisfied, the second reader may elect to automatically incorporate all the original reader's edits into the interactive book.

In accordance with an eleventh aspect of the present interactive book, the present interactive book may allow an original reader (who made edits or proposed edits to the interactive book) to partner with a second reader so that the original reader and the second reader may agree to swap each others edits to the interactive book.

In accordance with a twelfth aspect of the present interactive book, the present interactive book may allow a reader who made edit suggestions to the original interactive book to be paid an amount front a fund (or other award) based on the number of edits proposed by that reader which were accepted by a second or later reader and/or based on the total number of copies of the interactive books distributed winch include the original readers edits or proposed edits.

In accordance with a thirteenth aspect of the present interactive book, the present interactive book may allow an original reader to randomly accept an edit of a later (second) reader. In particular, the original reader may elect to allow a random edit of the original interactive book taken from the total pool of proposed edits by later readers or taken from a smaller pool of the proposed edits to the original book such as, for example, accepting a random edit from one the top 20% rated later readers which proposed edits.

BRIEF DESCRIPTION OF HE DRAWINGS

Illustrative embodiments of the present invention are described herein with reference to the accompanying drawings, in which.

DETAILED DESCRIPTION OF THE PREFERRED EMBODIMENTS

A method for changing printed material, hereafter called interactive book 10, is provided. The original interactive book 10 may have imbedded links 400-404 to an External Dedicated Book Addition 103. The present interactive book allows for multiple people to be able to constantly update External Dedicated Book: Additions 103 for the book and solve problems using hidden codes 608 to receive a reward. The External Dedicated Book Additions 103 may be a second source of information with respect to the original interactive book 10.

Figure 1:
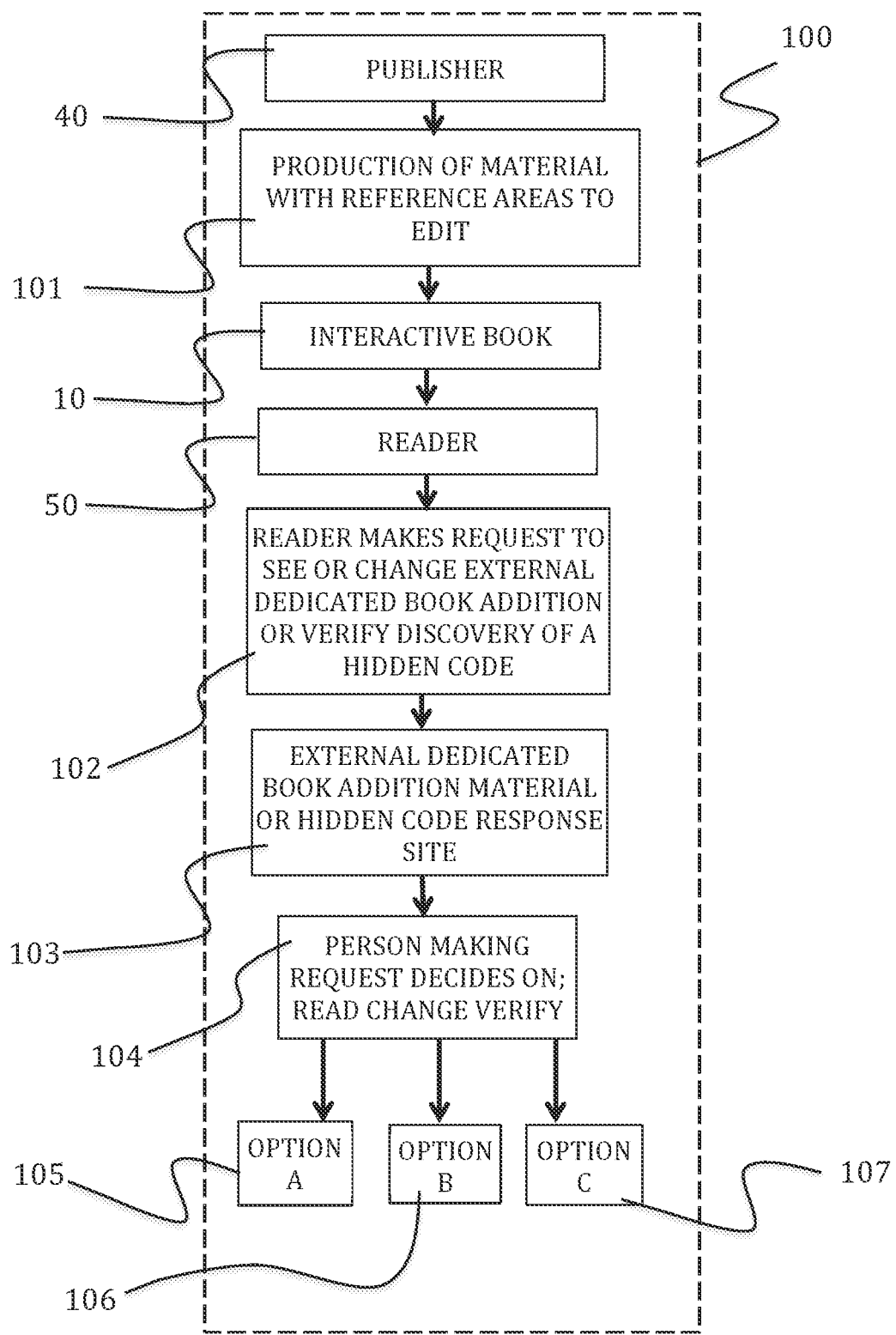
FIG. 1 illustrates a block diagram of a reader using system.

Referring first to FIG. 1 a block diagram of the Dynamic Editing System 100 is provided for an interactive book 10, in a first step, the publisher 40 of the interactive book 10 may produce or create a plurality of material/information 101 with hidden codes 608 and/or imbedded Links 400-404 located within the interactive book 10. A reader 50 of the interactive book 10 may make a Request 102 to see a desired External Dedicated Book Addition 103 referenced by the imbedded link 402 and/or to verify the discovery of any hidden codes 608 located in the interactive book 10. In an embodiment, the Request 102 may require a Proof-Of-Purchase code.

Such action by the reader 50 is hereafter referred to as a "Request" 102. All Requests 102 are directed to the appropriate External Dedicated Book Addition 103 response site, wherein the External Dedicated Book Addition response site 103 may read a Link ID 403. If the reader's 50 Request 102 consists of reading the External Dedicated Book Addition 103 information, then reader 50 may pick, for example, option 'A.' 105 and may then be automatically transferred to a website directed by that Link ID 403 wherein the External Dedicated Book Addition 103 information is provided. If the reader 50 makes the Request 102 through the Internet on an electronic device, then the delivery of that External Dedicated Book Addition 103 information will also be provided to the reader 50 via the Internet. If the Request 102 by the reader 50 is made by the reader 50 actively calling a telephone number provided by the publisher 40 of the original interactive book 10, then the delivery of the External Dedicated Book Addition 103 information to the reader 50 may be done by, for example, the reader 50 receiving a telephone recording of the External Dedicated Book Addition 103 information from the original publisher 40.

If the Request 102 is made by, for example, the reader 50 physically mailing in the request for the External Dedicated Book Addition 103 information via physical mail, then the delivery of the External Dedicated Book Addition 103 information to the reader 50 may be made by, for example, the same return means. As a result, a reader 50 may request an edit without the reader 50 needing to use the Internet in one embodiment.

If the reader 50 wishes to propose a change to the External Dedicated Book Addition 103 information provided, then the reader 50 may make a Request 102 and may pick, for example, option "B."106. The reader 50 will then be transferred to the Controller 202 of flue External Dedicated Book Addition 103 via same method used to make that Request 102. In one embodiment, the Controller 202 and the original publisher 40 is the same person. In another embodiment, the original publisher 40 and the Controller 202 are different people. In an embodiment wherein the Controller 202 and the original publisher 40 are different people, the original publisher 40 preferably selects the Controller 202. If the Request 102 is made to verify a discovery of a hidden code 608 then the reader may pick option 'C' 107 and automatically receive verification and/or further instructions via same method used to make the Request 102.

The Link ID 403 is preferably the alphanumeric group after the equal sign and before the first period in the footnote 402, in one embodiment qr99. The External Dedicated Book Addition site 404 for an Internet Request is preferably the alphanumeric group after the first period in the footnote 402, in this case myeblox.com 404. If the Request 102 is made by a method other than the Internet, then only the Link ID 403 is needed. The Link ID 403 sends the Reader to the latest stored External Dedicated Book Addition 103 response. The Reader, therefore, always receives the latest and most current edits in response to his/her Request 102, regardless of when he/she received his/her interactive book.

Figure 2:
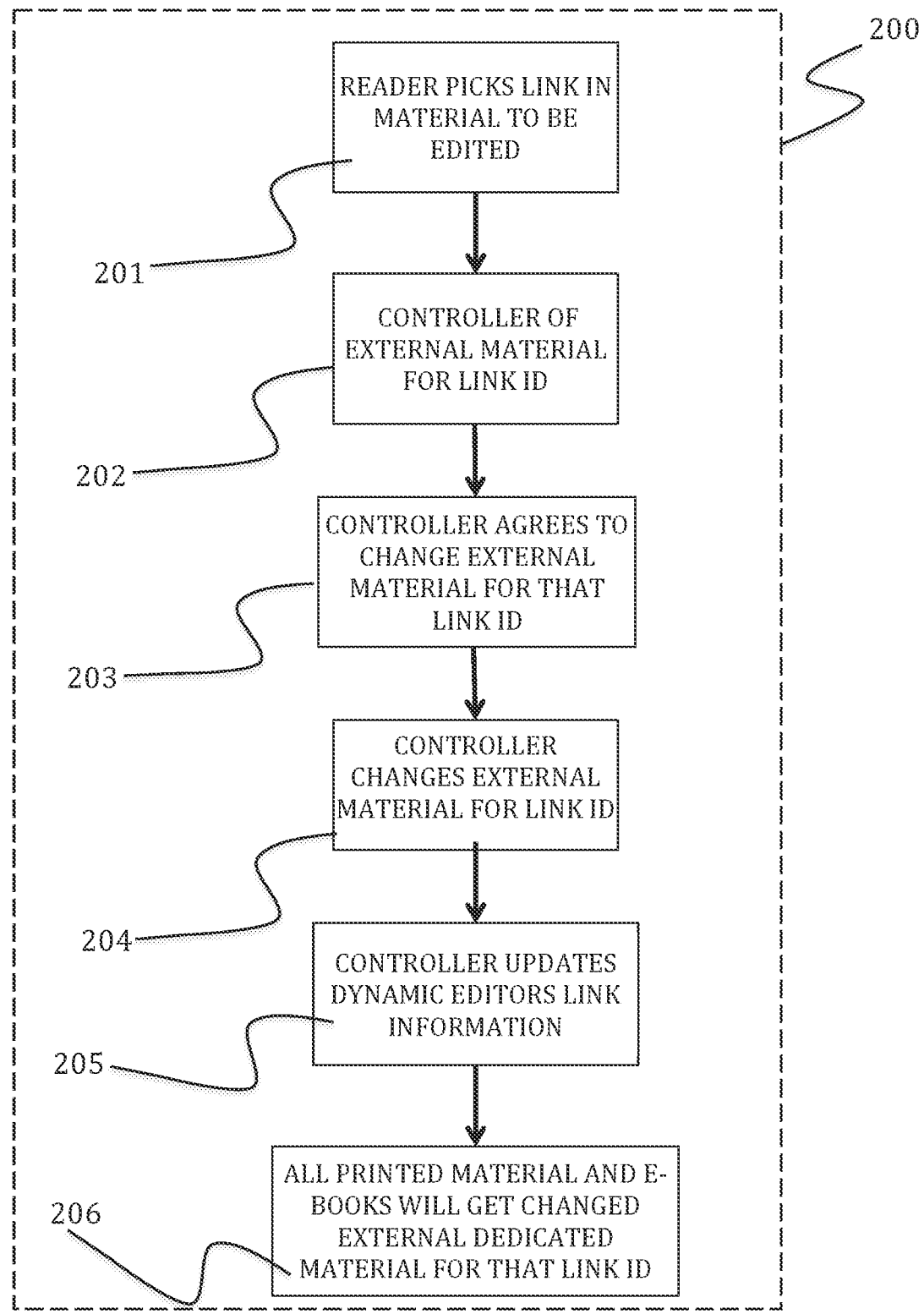
FIG. 2 illustrates a block diagram of changing External Dedicated Book Addition.

FIG. 2 is a block diagram 200 of how Imbedded Links 406-408 may be changed by the reader of the interactive book. For example, by selecting Option "B" 106 in a Request 102 the imbedded link 402 to be edited 201 is identified. The Reader 50 may contact the Controller 202 of the External Dedicated Book Addition 103 and may propose a better External Dedicated Book Addition 103 for that specific Link ID 201. After review of the issue, the External Dedicated Book Addition Controller 202 may then agree 203 to change or add the new response to that External Dedicated Book Addition 103 or may decline the request.

The External Dedicated Book Addition Controller 202 may then direct the read for "latest edit") 105 for that Link ID 201 to the changed External Dedicated Book Addition 204. The Reader 50 has now become a Dynamic Editor and the External Dedicated Book Addition Controller 202 may update the information accessed by the Dynamic Editors imbedded link 205, 401. All printed material and e-books 101 that use the same imbedded links will now be given the latest External Dedicated Book Addition 204 and will receive the latest dynamic editors information 206. In an embodiment, the Controller 202 may be required to enter a password in order to edit or otherwise control any External Dedicated Book Addition.

Figure 3:
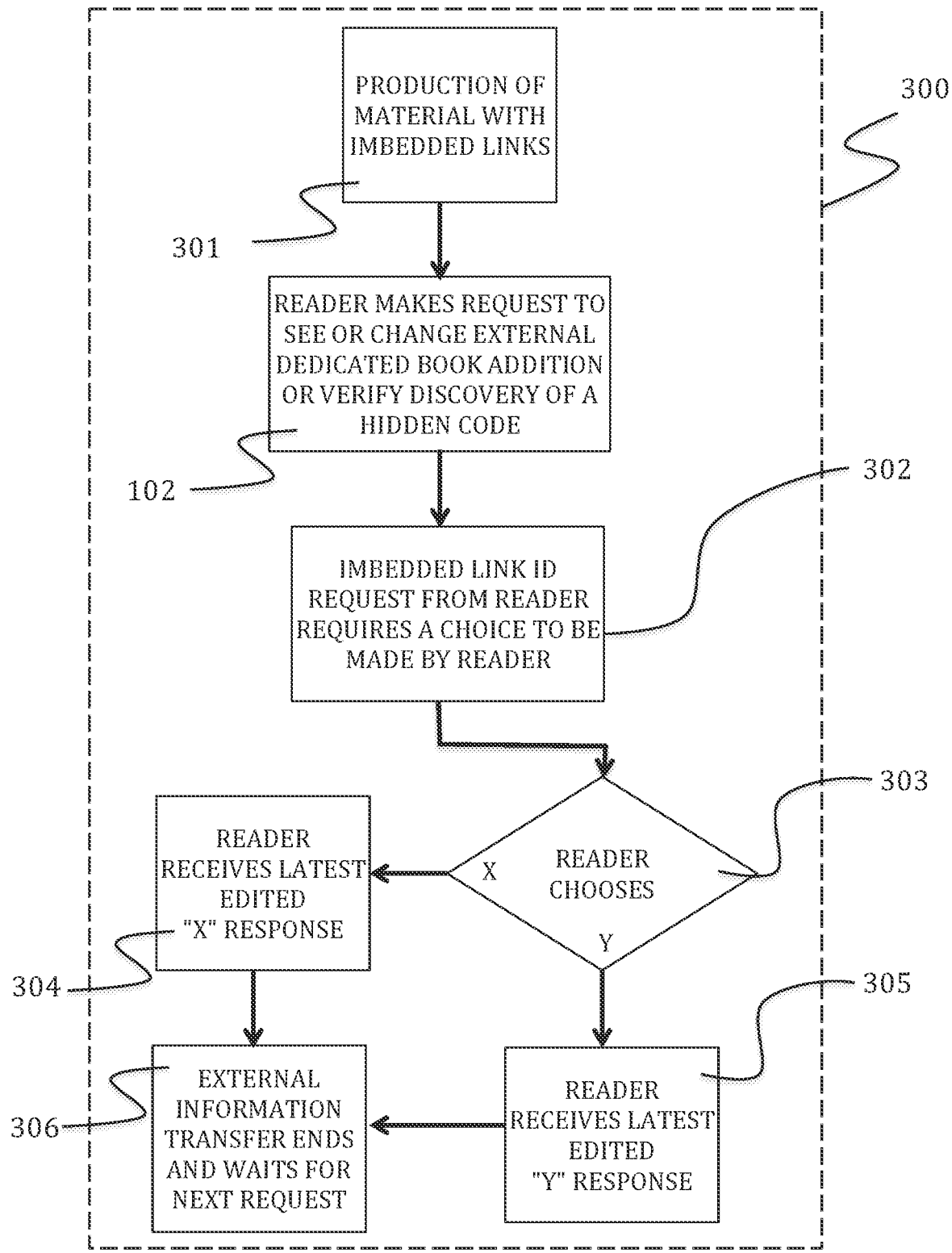
FIG. 3 illustrates a block diagram of making choice during a Request.

FIG. 3 is a block diagram 300 that shows how the Dynamic Editor System 100 may allow a reader 50 to make a choice during a read 105. Every Imbedded Link 406-408 may or may not offer choices 303, and every Imbedded Link may be changed to add a choice 304, 305 or delete a choice 304, 305. After activation, the reader is required to choose 302 a path. The choice 303 may consist of, for example, two choices including: X 304 or Y 305, or more alternate External Dedicated Book Addition paths. The reader 50 must pick a path 303. If reader 50 picks path X 304, the latest edited External Dedicated Book Addition X 304 will be delivered. If reader 50 picks path Y 305, the latest edited External Dedicated Book Addition Y 305 will be delivered. The delivery method will be via the same method used to make the Request 102. The External Dedicated Information delivery then ends 306 and system waits for next request.

Figure 4:
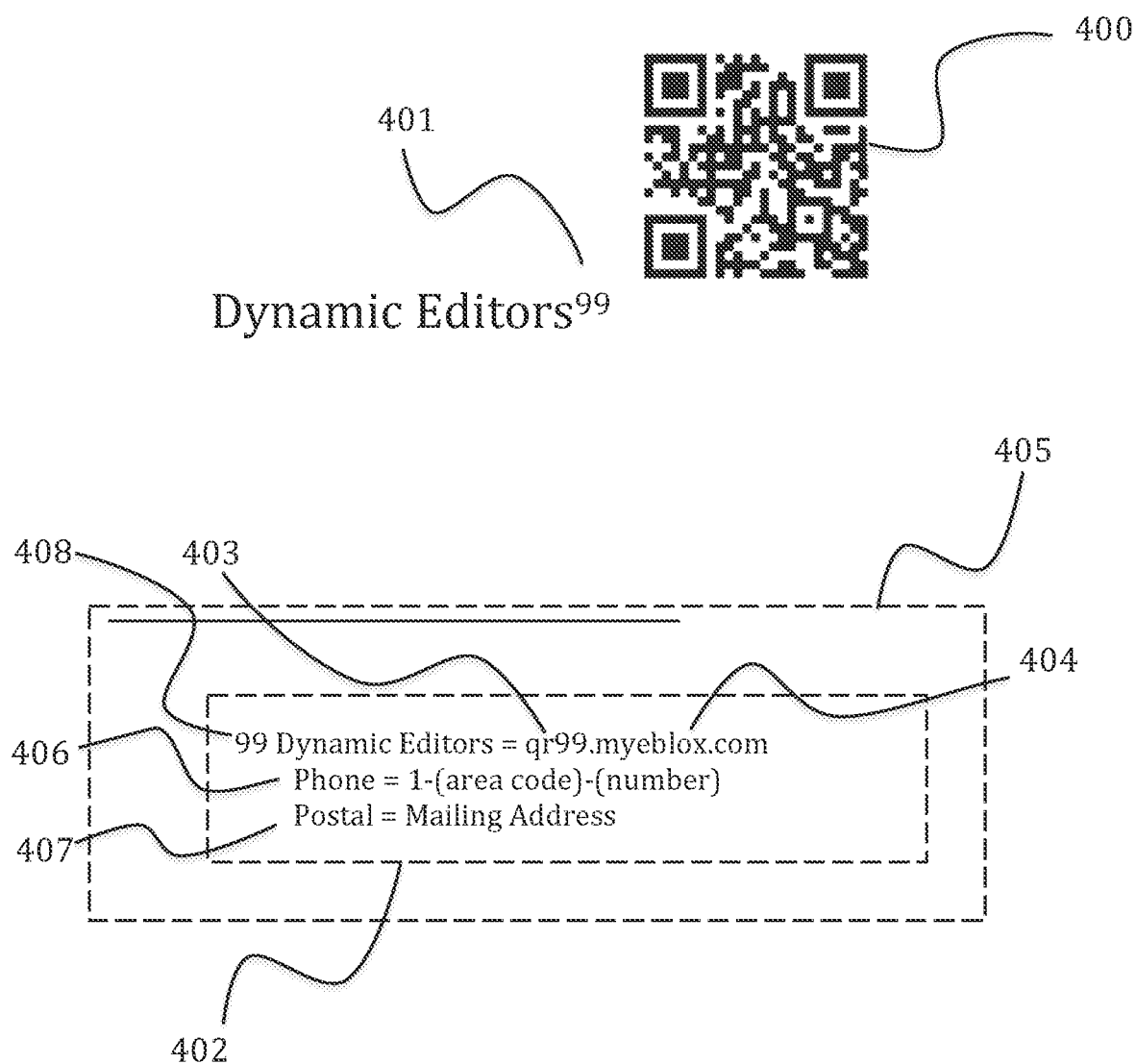
FIG. 4 is an actual working QR code for Dynamic Editors in a book.

FIG. 4 is a section of a page that shows a few working examples of reading External Dedicated Book Addition 103 using Embedded Links 406-408. The Quick Response Code 400 would use the Internet as a delivery system. The Link ID 403 is "qr99" which may also be found to be in the footnote number "99" 401, 402 in the footnote area 405. By focusing the camera of a device with Internet connection (for example, a cell phone) and with QR code reading capabilities on the imbedded link 400, a Request 102 is activated. The Controller's 202 website in the Dynamic Editors imbedded link 408 is "qr99.myeblox.com" 403, 404. The system may then respond to the Request 102 using Link ID 403 via Internet back to the cell phone. If the Request 102 is made using a phone without the Internet then the imbedded Link 406 is the phone number shown in the footnote 402. The Link ID 403 in this instance must be entered verbally or by touch-tone responses to audio instructions and the External Dedicated Book Addition 103 would be delivered as audio on the phone. If the Request 102 is made using a postal service 407 with the Link ID 403 enclosed, then the External Dedicated Book Addition 103 would be delivered by return mail.

Figure 5:
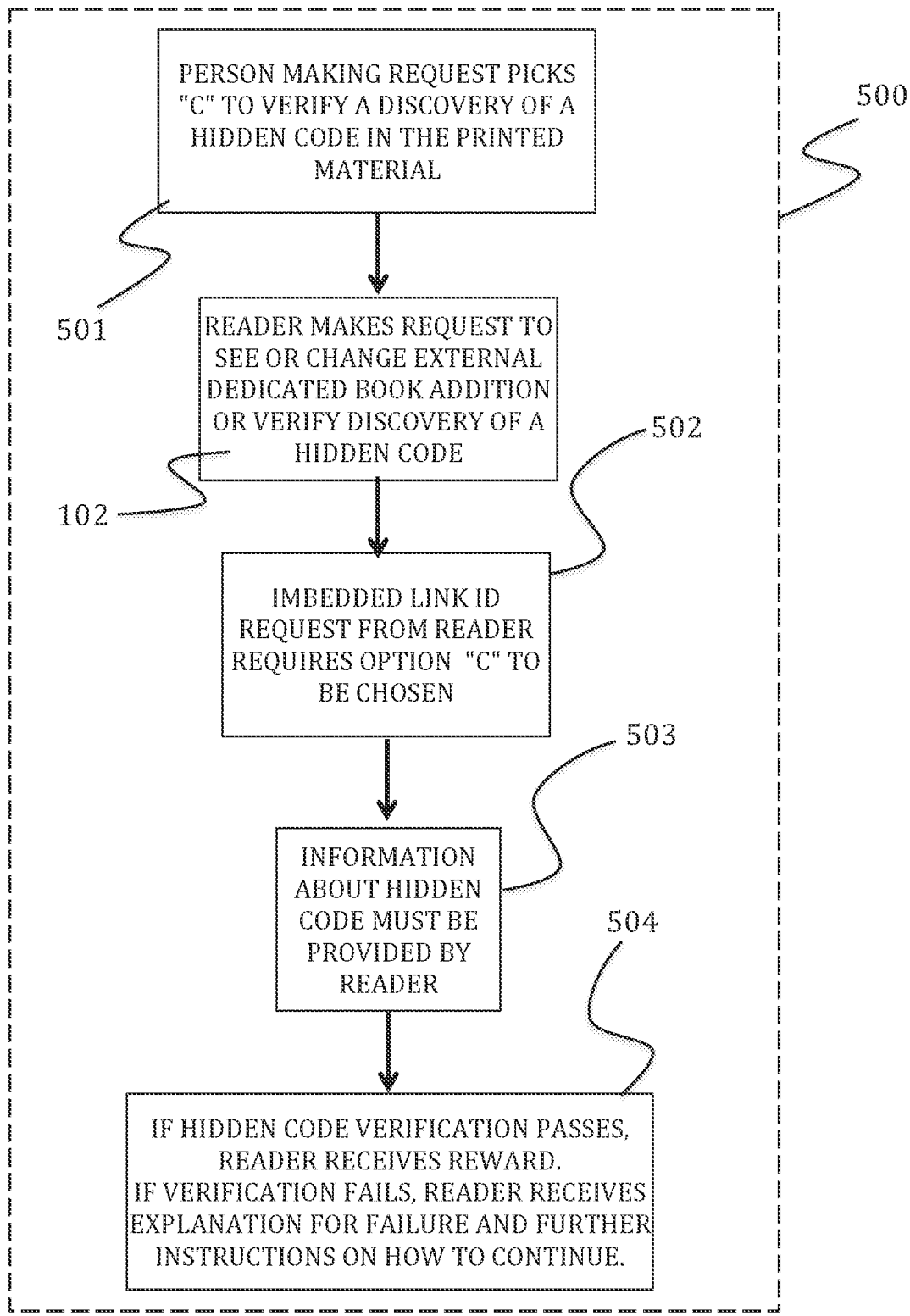
FIG. 5 illustrates how hidden codes are used and verified in a book

FIG. 5 is a block diagram 500 showing how a hidden code may be in the printed material. The reader of the material may also search and discover this hidden code. The reader 50 of the material may make a Request 102 with book Controller 202 to verify his/her discovery of the hidden code 501, 608. During the Request 102 the reader 50 must choose Option "C" 107, 502 to make verification. Information about hidden code 503 must be provided by reader to continue verification. Upon verification of a correct hidden code discovery the reader is given a reward 504. If verification of hidden code fails 504, the reader 50 receives explanation and further instructions. The information on discoveries of the hidden codes may also be published in the link used for dynamic editor information 408.

Figure 6:
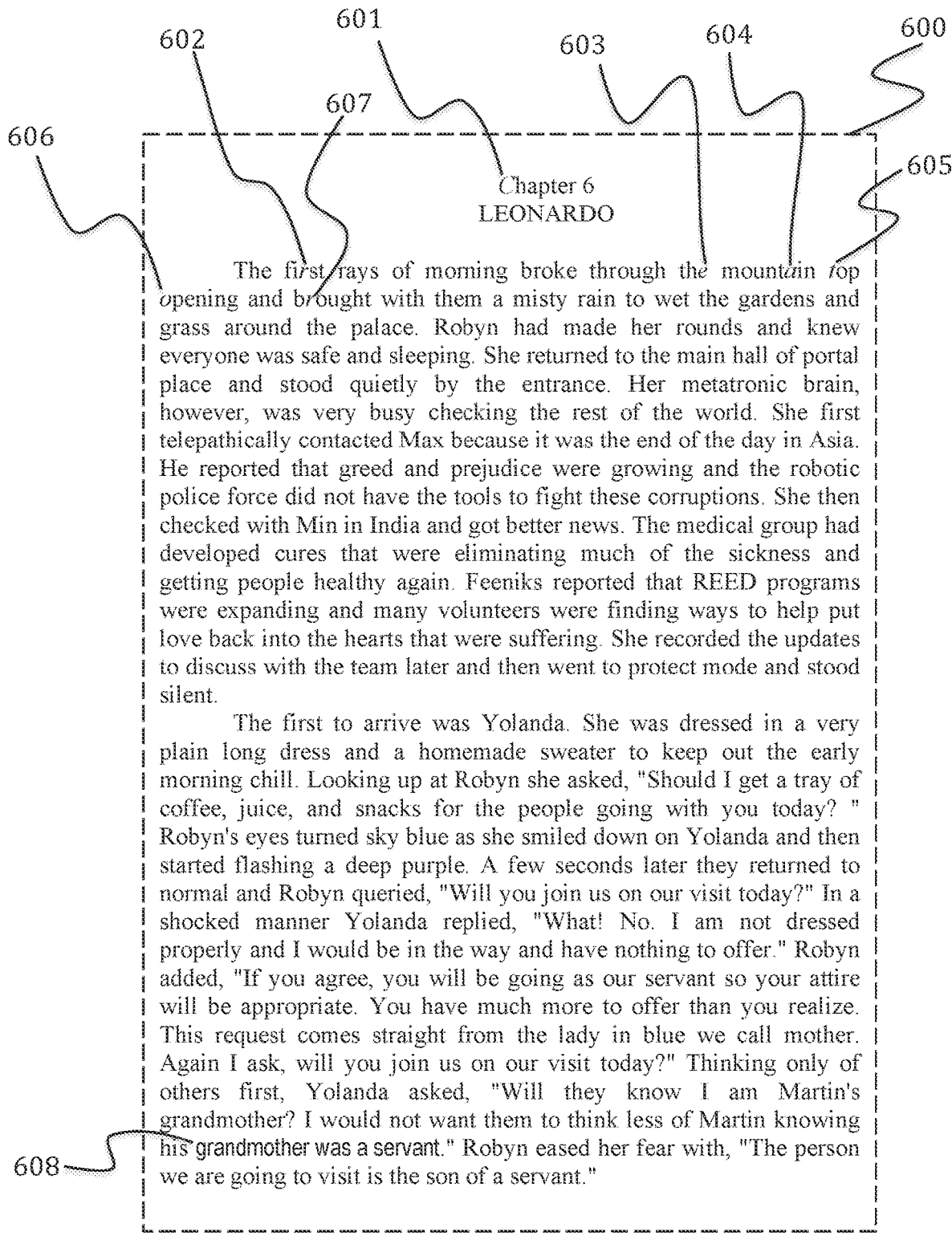
FIG. 6 illustrates how hidden codes may look in a book.
Figure 7:
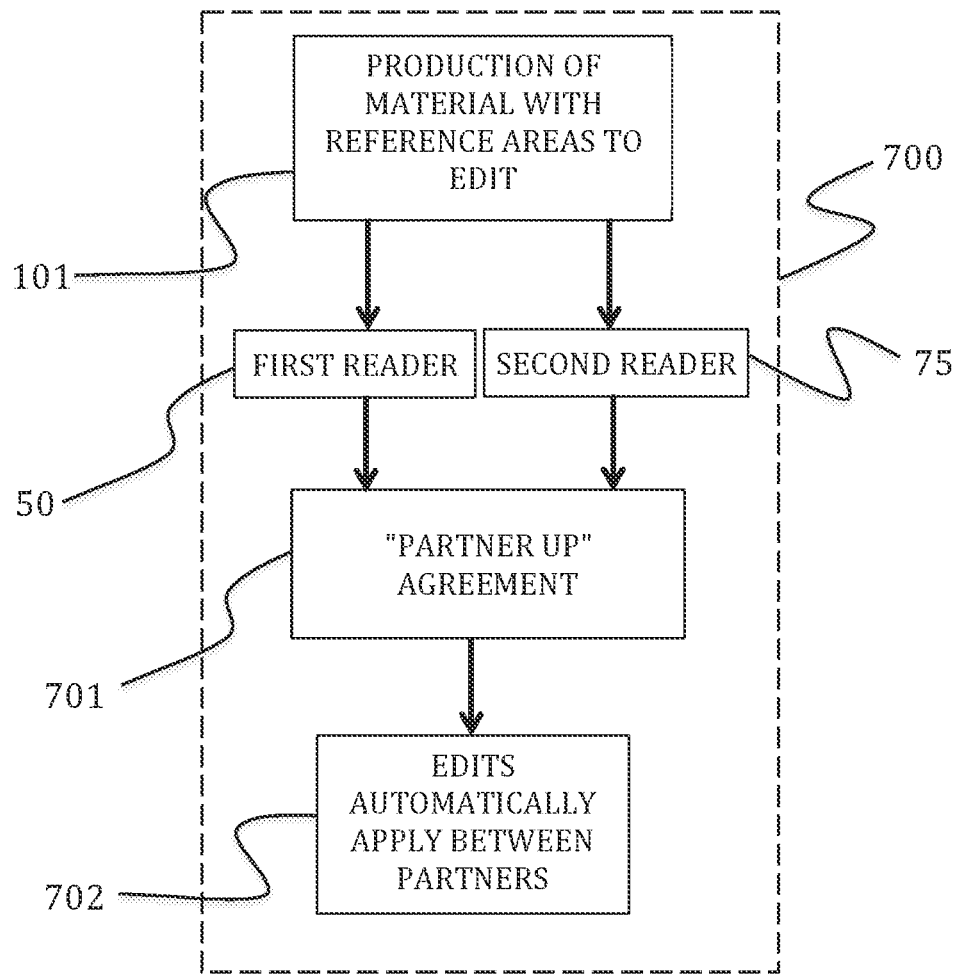
FIG. 7 illustrates how reader 1 and reader 2 may "partner up" for edits in a book.

FIG. 6 illustrates a page 600 with two examples of a hidden code 608 in the printed material. The first example uses Italics to identify the letters in the code. The first letter in the code is the capitol 'C' 601 which is also the first letter on the page in the word 'Chapter'. The second letter in the code is the 'r' 602 in the word 'first'. The third letter in the code is the 'e' 603 in the word 'the'. The fourth letter in the code is the 'a' 604 in the word 'mountain'. The fifth letter in the code is the 't' 605 in the word 'top'. The sixth letter in the code is the 'a' 606 in the word 'opening'. The final letter in the code is the 'r' 607 in the word 'brought'. In this example the hidden code is the single word 'Creator' when these letters are placed next to each other in the same order as they appear on the page.

The second example of a hidden code uses a change in the lettering font style to identify the code. Only the font of the phrase 'grandmother was a servant' 608 is different from the other letters on this page. Therefore, the second hidden code is 'grandmother was a servant' 608. In an audio book this example may become the pitch of the person reading the printed material.

In an embodiment, any proposed and/or entered edit by a reader 50 is credited to the reader 50 that proposed that edit. A searchable record of all the proposed edits by that reader 50 may be stored and accessed by any other "second" reader 75. In an embodiment, the second reader 75 may assign a subjective rating score to any or all of the first reader's 50 proposed edits. The rating score may be, for example, one a one to ten basis wherein ten represents an "excellent" proposed edit and wherein one represents a "very poor" proposed edit by that original reader 50. The original reader's 50 ratings may be viewable by any second reader 75 of the original interactive book 10.

In one embodiment, a second reader 75 may electively instruct the system 100 to automatically accept all of the proposed edits of first reader 50 in an original interactive book 10 if the second reader 75 likes the first reader's 50 edits. Once the second reader 75 automatically accepts all of the edits of the first reader 50, the second reader's 75 original interactive book 10 is automatically updated. The second reader 75 may also elect to later reverse the acceptance of the first reader 50 if the second reader 75 wishes to do so.

In one embodiment, the system 100 may allow two readers (a first reader 50 and a second reader 75) to "partner up" 701 and to automatically accept the edits that each other proposed. If two readers 50, 75 elect to "partner up" 701 and both elect to swap edits, the system 100 will then automatically apply 702 all of the first reader's 50 edits to the second reader 75 and all of the second reader's edits 75 to the first readers 50 original interactive book 10.

In one embodiment, the system 100 may allow a reader 50 who made edit suggestions to the original interactive book 10 to be paid an amount of money from a fund (or other award) based on the number of edits proposed by that reader 50 which were accepted by a second reader 75 and/or based on the total number of copies of the interactive books 10 distributed which include the first reader's 50 edits or proposed edits.

In one embodiment, the present system 100 may allow the first reader 50 to randomly accept an edit of a second reader 75. In particular, the first reader 50 may elect to allow a random edit of the first reader's 50 original interactive book 10 taken from the total pool of proposed edits by second readers 75 or taken from a smaller pool of the proposed edits to the original book 10 such as, for example, accepting a random edit from one the top 20% rated second reader 75 which proposed edits.

Although the above shows the embodiments of the invention pertaining only to printed material and e-books, it should be understood that they also apply to any recorded materials that can be converted to printed text or an e-book by use of devices such as scanners with original character recognition (ocr), speech recognition, touch tone decoding, just to mention a few. It should be understood that various changes and modifications to the presently preferred embodiments will be apparent to those skilled in the art. Such changes and modifications may be made without departing from the spirit and scope of the invention and without diminishing its attendant advantages.

I claim:

1. A system for recording changes to a dedicated external information source of a text, the system comprising:
    creating a body of text wherein the body of text has at least one link to the dedicated external information source and a second link to recorded changes of all dedicated external information sources;
    wherein activating the link automatically allows a reader to access external information source relative to the body of text;
    wherein the external information source may be continuously changed and updated by a controller wherein the controller is capable of approving changes to external information source when the link of that dedicated external information source is activated;
    wherein the dedicated external information source may be one suggested by a reader of the body of text and approved by the controller of the dedicated external information source;
    wherein the body of text has a unique imbedded link which redirects the reader to dedicated editing external information source; and
    wherein the dedicated editing external information source is only editable by the controller and wherein the controller records changes to all external dedicated information source changes in the second another link in the same printed material.

2. The system for recording changes to information of a text of claim 1 wherein any change to the dedicated editing external information source is recorded along with the date and time that change was made.

3. The system for recording changes to information of a text of claim 1 wherein any change to the dedicated editing external information source is recorded along with the name of the person that suggested that change.

4. The system for recording changes to information of a text of claim 1 wherein any deletion to the link to the dedicated external information source is recorded.

* * * * *